US009626361B2

(12) United States Patent
Greenwood et al.

(10) Patent No.: US 9,626,361 B2
(45) Date of Patent: Apr. 18, 2017

(54) USER-TRAINED SEARCHING APPLICATION SYSTEM AND METHOD

(71) Applicants: Paul Greenwood, Dallas, TX (US); Elizabeth Leigh Nielsen, Santa Monica, CA (US)

(72) Inventors: Paul Greenwood, Dallas, TX (US); Elizabeth Leigh Nielsen, Santa Monica, CA (US)

(73) Assignee: WEBUSAL LLC, Santa Monica, CA (US)

( * ) Notice: Subject to any disclaimer, the term of this patent is extended or adjusted under 35 U.S.C. 154(b) by 224 days.

(21) Appl. No.: 14/273,663

(22) Filed: May 9, 2014

(65) Prior Publication Data

US 2015/0324434 A1 Nov. 12, 2015

(51) Int. Cl.
*G06F 7/00* (2006.01)
*G06F 17/30* (2006.01)
*G06N 99/00* (2010.01)

(52) U.S. Cl.
CPC ........ *G06F 17/30* (2013.01); *G06F 17/30554* (2013.01); *G06F 17/30864* (2013.01); *G06N 99/005* (2013.01)

(58) Field of Classification Search
CPC ......... G06F 17/30554; G06F 17/30864; G06F 17/30867; G06F 17/30528; G06F 3/04842
USPC .......................................................... 707/722
See application file for complete search history.

(56) References Cited

U.S. PATENT DOCUMENTS

| 7,165,070 B2 | 1/2007 | Page et al. | |
| 7,359,951 B2 * | 4/2008 | Goel | G06F 17/30554 |
| | | | 707/E17.108 |
| 7,657,333 B2 * | 2/2010 | Bradford | G05B 21/02 |
| | | | 700/34 |

(Continued)

OTHER PUBLICATIONS

Romero et al.,"Mining and Visualizing Visited Trails in Web-Based Educational Systems", accessed at http://www.educationaldatamining.org/EDM2008/uploads/proc/19_Romero_19.pdf; on Jul. 28, 2016.

*Primary Examiner* — Hosain Alam
*Assistant Examiner* — Nicholas Allen
(74) *Attorney, Agent, or Firm* — The Danamraj Law Group, P.C.

(57) ABSTRACT

System, apparatus, user equipment, and associated computer program and computing methods are provided for suggesting websites that are relevant based on the user's browsing history and past search results. In one aspect, a hosted computer application stores the user's browsing history and search results using a cloud-based storage facility, and computing methods, using machine learning techniques, are operative to predict websites the user may want to visit next. Example machine learning techniques may be configured to use non-parsed and unstructured data to identify patterns and map hundreds of thousands of data elements, to predict which website(s) the user might like to visit in a search/browsing session. Example machine learning techniques may be further operative to recognize patterns and analyze data at each interaction with the user. The training of example machine learning techniques is driven by user interaction, allowing the removal of non-relevant or less relevant websites from the suggested websites via a suitable user interface.

19 Claims, 6 Drawing Sheets

(56) References Cited

U.S. PATENT DOCUMENTS

| | | |
|---|---|---|
| 8,606,666 B1 | 12/2013 | Courbage et al. |
| 8,655,819 B1 | 2/2014 | Burkard et al. |
| 8,666,036 B2 | 3/2014 | Schwartz |
| 2004/0202987 A1* | 10/2004 | Scheuring ............... G09B 7/02 434/118 |
| 2006/0155707 A1* | 7/2006 | Marcjan ............ G06F 17/30876 |
| 2008/0228868 A1* | 9/2008 | Sivakoff .................. G09B 7/02 709/203 |
| 2010/0070448 A1* | 3/2010 | Omoigui ............ H01L 27/1463 706/47 |
| 2010/0070876 A1* | 3/2010 | Jain ....................... G06Q 30/02 715/748 |
| 2012/0289117 A1* | 11/2012 | Nielsen ................... A63H 3/16 446/100 |
| 2013/0024464 A1* | 1/2013 | Berner .............. G06F 17/30864 707/749 |
| 2013/0073985 A1* | 3/2013 | Hamlin ................ G06F 3/0481 715/753 |
| 2013/0144818 A1* | 6/2013 | Jebara .................. G06N 99/005 706/12 |
| 2013/0238649 A1* | 9/2013 | Shum ................ G06F 17/30292 707/758 |
| 2014/0040243 A1* | 2/2014 | Rubinstein ........ G06F 17/30554 707/722 |
| 2014/0040244 A1* | 2/2014 | Rubinstein ........ G06F 17/30528 707/722 |
| 2014/0040285 A1* | 2/2014 | Rubinstein .......... G06F 17/3053 707/751 |
| 2014/0074409 A1* | 3/2014 | Boyd ................ G05B 19/4183 702/35 |
| 2014/0075004 A1* | 3/2014 | Van Dusen ............. H04L 41/04 709/223 |
| 2014/0081710 A1* | 3/2014 | Rabie .................... G06Q 30/02 705/7.35 |
| 2014/0115010 A1* | 4/2014 | Seth .................. G06F 17/30861 707/798 |
| 2014/0122384 A1* | 5/2014 | Champion ............. G09B 29/00 706/12 |

* cited by examiner

USER-TRAINED SEARCHING APPLICATION SYSTEM AND METHOD

FIELD OF THE DISCLOSURE

The present disclosure generally relates to Internet searching and web browsing technologies. More particularly, and not by way of any limitation, the present disclosure is directed to effectuating a user-trained Internet searching application system and method.

BACKGROUND

When a user enters a query into a search engine (typically by using keywords), the engine examines its index and provides a listing of best-matching web pages according to its criteria, usually with a short summary containing the document's title and sometimes parts of the text. Most search engines support the use of the Boolean operators such as AND, OR and NOT, for example, to further specify the search query. Whereas typical search engines look for the words or phrases exactly as entered (i.e., string matching), some search engines provide an advanced feature called proximity search, which allows users to define the distance between keywords. Further techniques also allow concept-based searching as well as natural language queries.

The usefulness of a search engine depends on the relevance of the result set that is returned. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Most Internet search engines are commercial ventures supported by advertising revenue and thus some of them allow advertisers and/or website owners/operators to have their listings ranked higher in search results for a fee. Furthermore, although search engines are programmed to rank websites based on some combination of their popularity and relevancy, empirical studies indicate various political, economic, and social biases in the information they provide.

Accordingly, it should be appreciated that although several advances have been made in Internet searching, there is still room for further improvement as will be detailed below.

SUMMARY

The present patent disclosure is broadly directed to a user-trainable searching application, and associated user equipment, computer program and products for suggesting websites that are relevant based on the user's browsing history and past search results. In one aspect, a hosted computer application stores the user's browsing history and search results using a cloud-based storage facility. Computing methods, using machine learning techniques, are operative to predict websites the user may want to visit next. Example machine learning techniques may be configured to use non-parsed and unstructured data to identify patterns and map hundreds of thousands of data elements, to predict which website(s) the user might like to visit in a search/browsing session. Example machine learning techniques may be further operative to recognize patterns and analyze data at each interaction with the user. The training of example machine learning techniques is preferably driven by user interaction, allowing the removal of non-relevant and/or less relevant websites from the suggested websites via a suitable user interface. In one embodiment, an Internet searching application method is disclosed that comprises, inter alia, the following features: receiving a user input with respect to an Internet searching session established at a user equipment (UE) device; determining search results responsive to the user input based on a predictive analytical model; presenting the search results in a visualization format to be displayed at the UE device; receiving a user interaction response comprising at least one of deleting a search result from the visualization format; and utilizing the user interaction response as an input to a training machine used in association with the predictive analytical model, thereby modulating predictive behavior of the predictive analytical model with respect to future searching sessions of the user.

In another aspect, an embodiment of a server environment comprising one or more network nodes is disclosed. The example server environment is operative to execute a user-trainable searching application and comprises, inter alia, the following features: one or more processors distributed among the one or more network nodes; and one or more persistent memory modules distributed among the one or more network nodes and coupled to the one or more processors, the one or more persistent memory modules having program instructions stored thereon which, when executed by the one or more processors, are configured to: responsive to receiving a user input with respect to an Internet searching session established at a UE device, determine a plurality of search results based on a predictive analytical model; present the search results in a visualization format to be displayed at the UE device; process a user interaction response comprising at least one of deleting a search result from the visualization format; and utilize the user interaction response as an input to a training machine used in association with the predictive analytical model, thereby modulate predictive behavior of the predictive analytical model with respect to future searching sessions of the user.

In still further aspects, one or more embodiments of a non-transitory computer-readable medium containing computer-executable program instructions or code portions stored thereon are disclosed for performing one or more embodiments of the methods set forth herein when executed by one or more processors of a network node, element, UE device, and the like.

Embodiments of the present invention advantageously provide better search results (i.e., more relevant) based on user-trained predictive analytical models that capitalize on "Big Data" processing techniques. As the databases grow larger, the predictive analytical models become more refined and, accordingly, faster convergence rates to search results are also expected.

Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
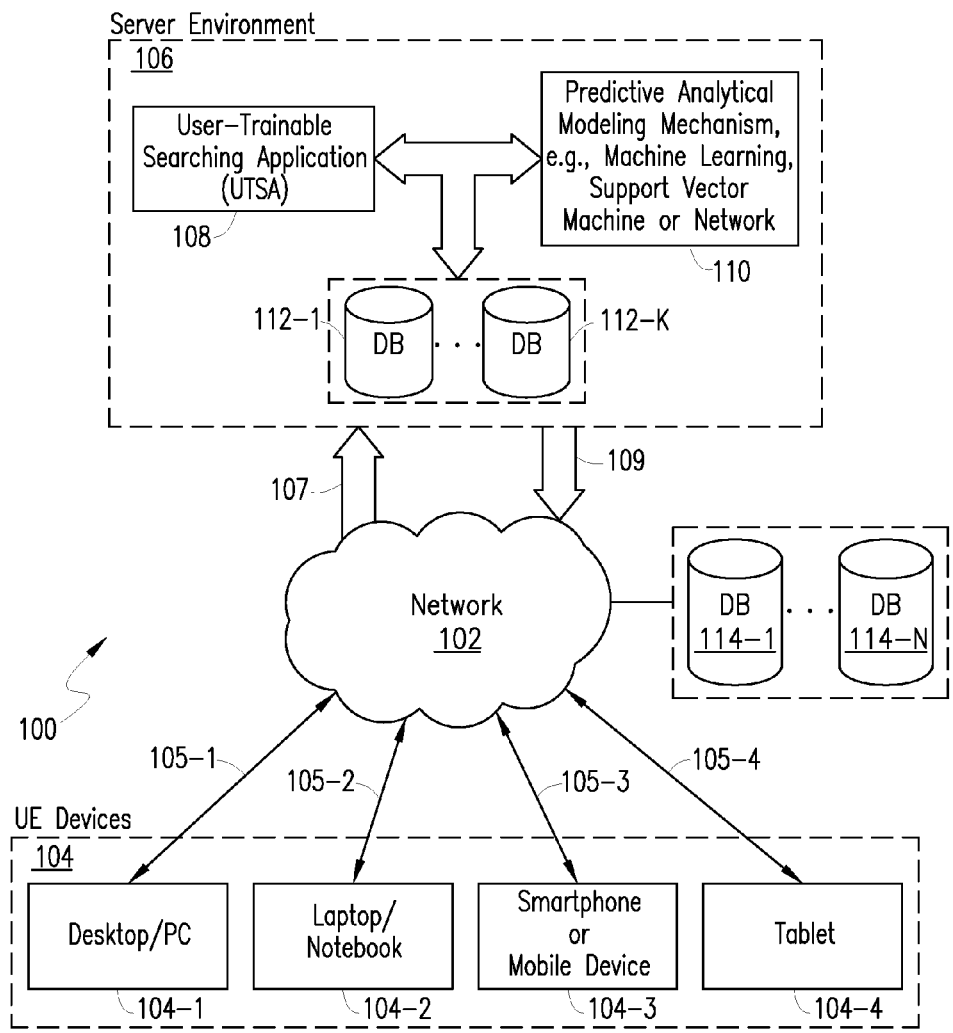
FIG. 1 depicts an example network environment wherein one or more embodiments of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example network environment 100 wherein one or more embodiments of the present patent application may be practiced. Those skilled in the art will recognize that the network environment 100 is illustrative of a distributed computing environment involving a wide area packet-switched network 102 (e.g., the Internet, an enterprise intranet, or a combination thereof) wherein users may access and/or search for information organized into a system of interlinked hypertext documents or pages (i.e., the World Wide Web or simply the "web") by visiting websites using any number/type of user equipment (UE) devices. By way of illustration, UE devices 104 including but not limited to desktop computers or personal computers 104-1, laptops/notebooks 104-2, mobile devices such as smartphones 104-3, tablets 104-4, and the like, are exemplary of such UE devices for accessing web-based information via browsing and/or searching. As is well known, websites may be searched or browsed by entering appropriate addresses such as Uniform Resource Locators (URLs), Uniform Resource Identifiers (URIs), Uniform Resource Names (URNs), etc. in a browsing application (e.g., a web browser or a browser "app" optimized for mobile devices) executing on a UE device 104 or by "clicking" or selecting various hyperlinks, hot links or embedded addresses within a web page obtained as a result of browsing and/or searching. As such, UE devices 104 are operative to execute one or more browsing programs (e.g., Google Chrome, Mozilla FireFox, Internet Explorer, Opera, Safari, etc.) as well as search engines and/or metasearch engines (e.g., Baidu, Bing, Google, Yahoo!, Alta Vista, Dogpile, Excite, Ask.com, etc.) for retrieving information from the web using appropriate communication links to the network 102, e.g., links 105-1 to 105-4, that may be implemented in any wireline/wireless access technologies.

A server environment 106 is operative to host a user-trainable searching application (UTSA) 108 for purposes of the present patent application as will be described in detail hereinbelow. Preferably, server environment 106 may be architected as a distributed network wherein several servers (e.g., server farms), co-located or otherwise, may interoperate in concert to effectuate the UTSA functionality. In one embodiment, UTSA 108 may be associated and/or otherwise coupled to a predictive analytical modeling (PAM) mechanism 110 that may be based on and/or co-located with suitable machine learning (ML) techniques, support vector machines (SVMs) or support vector networks (SVNs), pattern recognition, artificial intelligence (AI) techniques, neural networks, and the like, for modulating the predictive behavior of the UTSA functionality with respect to a user's Internet searching and/or browsing. For purposes of the present disclosure, it should be appreciated that SVMs and SVNs are treated somewhat analogously and the terms may be used interchangeably. Accordingly, the terms "SVM/SVN", "SVM", and "SVN" may be equivalently used without limitation. One or more databases 112-1 to 112-K may be provided as part of the server environment 106 for storing various types of data, e.g., browsing history data, search results data, user profile/preferences data, user interaction response data, and the like, preferably in a "Big Data" storage environment for facilitating machine learning based on vast amounts of available data. Additionally or alternatively, such data may also be stored elsewhere on the network 102, as exemplified by a data store of databases 114-1 to 114-N, that may be accessible to the UTSA mechanism 108 and/or the PAM mechanism 110.

As pointed out hereinabove, a user may engage in web browsing and/or searching using a variety of UE devices 104 disposed in wireline/wireless environments. Reference numeral 107 generally refers to a mechanism for transmitting user inputs and/or user interaction responses to the server environment 106 via the network 102 pursuant to a browsing/searching session launched on a UE device. In similar fashion, reference numeral 109 generally refers to a mechanism for transmitting search/browsing results for presentation to the users via the network 102. Regardless of the UE device(s) where different browsing/searching sessions may be launched by a particular user, browser/search data and user interaction response data may be gathered and recorded for the particular user across one or more devices based on the user profile/preferences configuration that is operative to specify the devices commonly registered to or otherwise associated with the particular user. Although "browsing" may typically involve entering a URL/URI or other website address in a browser command bar and "searching" may typically involve entering one or more search terms in a search engine's input bar, it should be appreciated that the functionalities of "browsing" and "searching" are treated somewhat analogously for purposes of present patent disclosure since the data generated, gathered and recorded relative to both functionalities may be utilized for training a suitable PAM mechanism. In addition, the term "websites" may be interchangeably used herein with similar terms, such as URLs/URIs (partial or complete), web pages, online locations, etc. Accordingly, the term "websites" within the disclosure may be replaced by any of equivalent terms above, or any other web-address representatives used within the public Internet, private enterprise intranet, and/or any combination thereof.

Figure 2:
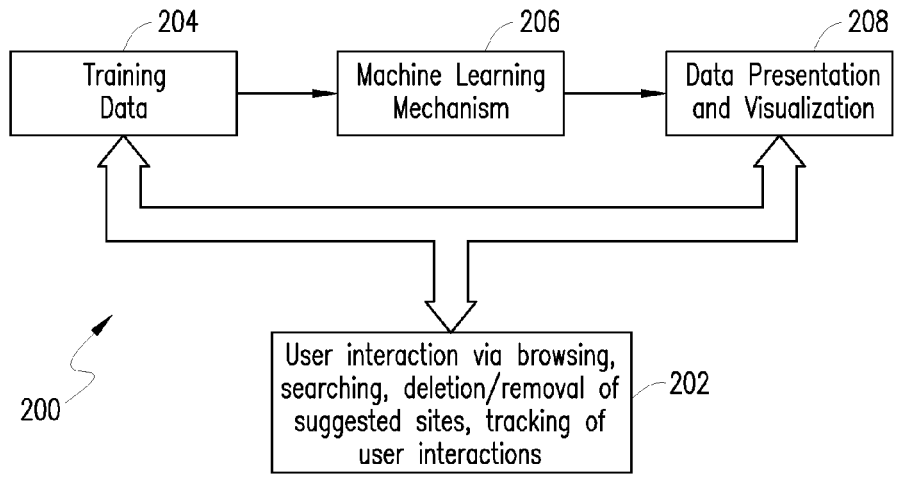
FIG. 2 depicts an example operational flow diagram for training a search application based on user interactions according to an embodiment of the present patent application.

Further, because each individual user's browsing/searching interactions may be different, a PAM mechanism may be trained in disparate ways for different users with respect to the searching functionality. FIG. 2 depicts an example operational flow diagram or model 200 for training a search application based on user interactions according to an embodiment of the present patent application. As the user initially engages in browsing/searching (e.g., after registering with a UTSA service and consents to collecting and recording data), websites and/or search terms entered, websites from search results visited, duration of the visits, time-of-day and location information, type of UE device(s) used, etc., may provide or server as initial training data 204 for a machine learning mechanism 206 associated with the UTSA service. Data relating to the search results may be presented in a suitable visualization format (e.g., linked lists, interconnected graphical trees, etc.) based on a presentation/visualization block 208. In accordance with the teachings of the present patent disclosure, the user may be allowed to interact with the search results beyond merely scrolling through the search results and/or visiting one or more websites identified therein. Preferably, the user may select one or more websites to be deleted or removed from the search results based on the user's perception of whether the website is relevant or not. Further, the training model 200 may keep track of a historical record of user interactions, including the deleted websites, searches or browsing sessions from which the websites were deleted, associated search terms, web URLs (full or partial), etc. As exemplified at block 202, such enhanced user interactivity and data tracking may be used as a feedback input to the training data 204, whereby the machine learning mechanism 206 is continually provided with ever-evolving input conditions that can help facilitate faster convergence to better (i.e., more relevant) search results in subsequent Internet search/browsing sessions.

Figure 3:
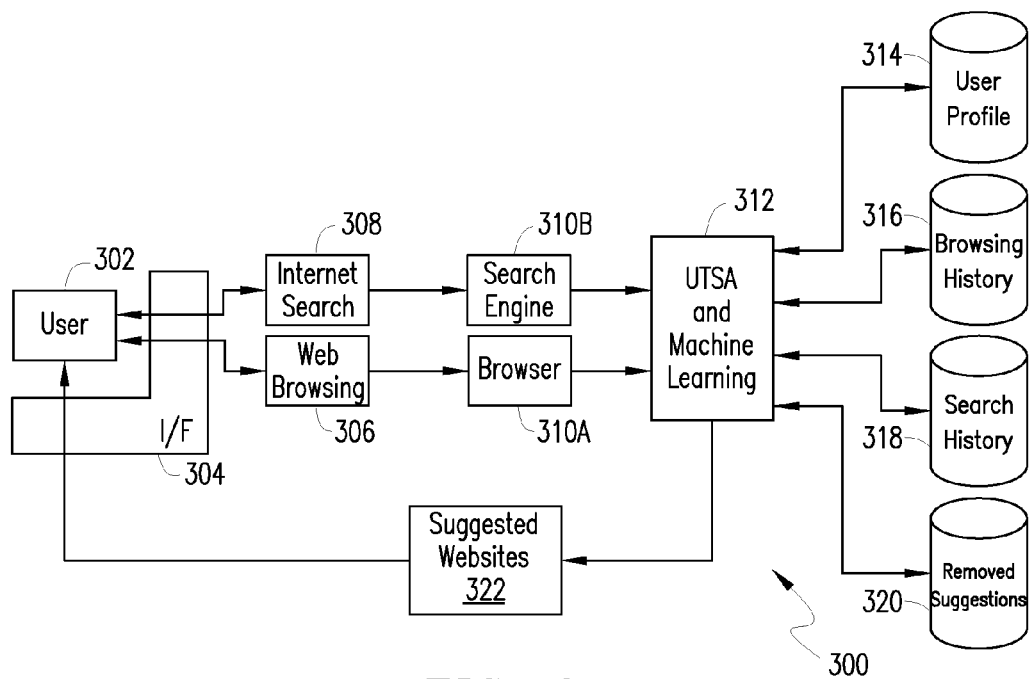
FIG. 3 depicts a block diagram illustrative of an example user interaction scheme relative to web browsing and searching.

FIG. 3 depicts a block diagram illustrative of an example user interaction scheme 300 relative to web browsing/searching according to an embodiment. User 302 is operative to launch an Internet session via a suitable UE interface (I/F) 304 that may involve web browsing 306 (e.g., by way of a browser or browser app 310A) and/or searching 308 (e.g., by way of a search engine 310B). Although depicted as two separate user interactions, search engine interactions may be provided as part of a browser session wherein one or more search engines may be selectably preconfigured for the user. Accordingly, as alluded to previously, it should be appreciated that the terms "browse" or "browsing" may be used somewhat interchangeably with terms "search" or "searching" for purposes of the present disclosure. Therefore, the term "search/browse" may mean "search" alone, "browse" alone, or both, depending on the context, and may involve multiple browsing tabs opened in a single session or several sessions launched at the same time, or multiple search engines and/or browsers. A cloud-based UTSA and associated machine learning mechanism 312 is operative, responsive to user search/browsing input, to generate search results including suggested websites 322. As discussed previously, such search results are preferably based on "Big Data" analytics involving user profile/preferences 314, browsing history 316, past search results 318, and removed suggestions data 312, all of which may be provided as cloud-based storage. Preferably, the data may be stored in un-parsed and unstructured format, i.e., without any particular formal storage format that is typically required for traditional data string matching.

In the context of the foregoing, "Big Data" may be used as a term for a collection of data sets so large and complex that it becomes virtually impossible to process using conventional database management tools or traditional data processing applications. Challenges involving "Big Data" may include capture, curation, storage, search, sharing, transfer, analysis, and visualization, etc. Because "Big Data" available with respect to user search/browsing data can be on the order of several terabytes to petabytes to exabytes, it becomes exceedingly difficult to work with using most relational database management systems for optimizing, ranking and indexing search results in typical environments. Accordingly, the UTSA mechanism and associated machine learning component 312 may preferably be implemented in a "massively parallel processing" (MPP) architecture with software running on tens, hundreds, or even thousands of servers. It should be understood that what is considered "Big Data" may vary depending on the capabilities of the organization or service provider managing the databases, and on the capabilities of the applications that are traditionally used to process and analyze the data set for optimizing searching. In one example implementation, the databases set forth above may be implemented in an open-source software framework such as, e.g., Apache Hadoop, that is optimized for storage and large-scale processing of data sets on clusters of commodity hardware. In a Hadoop-based implementation, the software framework may comprise a common set of libraries and utilities needed by other modules, a distributed file system (DFS) that stores data on commodity machines configured to provide a high aggregate bandwidth across the cluster, a resource-management platform responsible for managing compute resources in the clusters and using them for scheduling of UTSA execution, and a MapReduce-based programming model for large scale data processing.

As part of the machine learning component of UTSA 312, an SVM/SVN may be provided as a supervised learning model with associated learning algorithms that analyze data and recognize patterns that may be used for multivariate classification, cluster analysis, regression analysis, and similar techniques. Given example training data sets (e.g., training data sets 204 that may be accumulated during initial search/browsing sessions as described above in reference to FIG. 2 or imported from some other previously developed databases), each marked as belonging to one or more categories, an SVM/SVN training methodology builds a model that assigns new examples into one category or another, making it a non-probabilistic binary linear classifier in a binary classification scheme. An SVM model may be considered as a representation of the examples as points in space, mapped so that the examples of the separate categories are divided by a clear gap that is as wide as possible (i.e., maximal separation). New examples are then mapped into that same space and predicted to belong to a category based on which side of the gap they fall on. In addition to performing linear classification, SVMs can also be configured to perform a non-linear classification using what is called the "kernel trick", implicitly mapping their inputs into high-dimensional feature spaces. In a multiclass SVM, classification may typically be reduced (i.e., "decomposed") to a plurality of multiple binary classification schemes. Typical approaches to decompose a single multiclass scheme may include, e.g., (i) one-versus-all classifications; (ii) one-versus-one pair-wise classifications; (iii) directed acyclic graphs; and (iv) error-correcting output codes.

Continuing to refer to FIG. 3, search results identified or otherwise predicted by the UTSA mechanism 312 based on the techniques set forth above may be provided as a plurality of suggested or recommended websites graphically presented in a suitable visualization scheme (block 322) that is effectuated via UE interface (I/F) 304. The user may thereafter remove one or more of the suggested websites based on the user's assessment of a website, which interaction(s) become recorded as part of the removed suggestions database 320 used for iteratively training the UTSA mechanism.

In a typical usage scenario involving the foregoing interaction scheme, user 302 may first register with the UTSA service to enable recording of browsing/searching history, including search results and subsequent web page selections (i.e., web surfing) as well as other interactions, as part of an initial account setup. A user/subscriber account may be created at the service provider network hosting the UTSA mechanism 312, which may include configuring a suitable user profile/preferences database. User 302 may log into the UTSA service and allow recording of browsing history and search results. Using a default browser, user 302 can initiate a browsing/searching session, whereupon all user browsing history and search results may be stored on hosted/cloud database environment (e.g., in un-parsed and unstructured format). Applicable PAM and machine learning techniques are used to predict and suggest websites to the user in a suitable presentation/visualization, wherein the user may select certain websites for removal. As new searches are performed, browsing history is stored and suggested websites are removed in subsequent sessions, UTSA's PAM and machine learning methodology continues to enhance the predictions of websites the user might like to see. In one embodiment, website suggestions may be computed and displayed at the time a user logs into the UTSA service even before any particular search is launched by the user (e.g., pre-search predictions).

Figure 4:
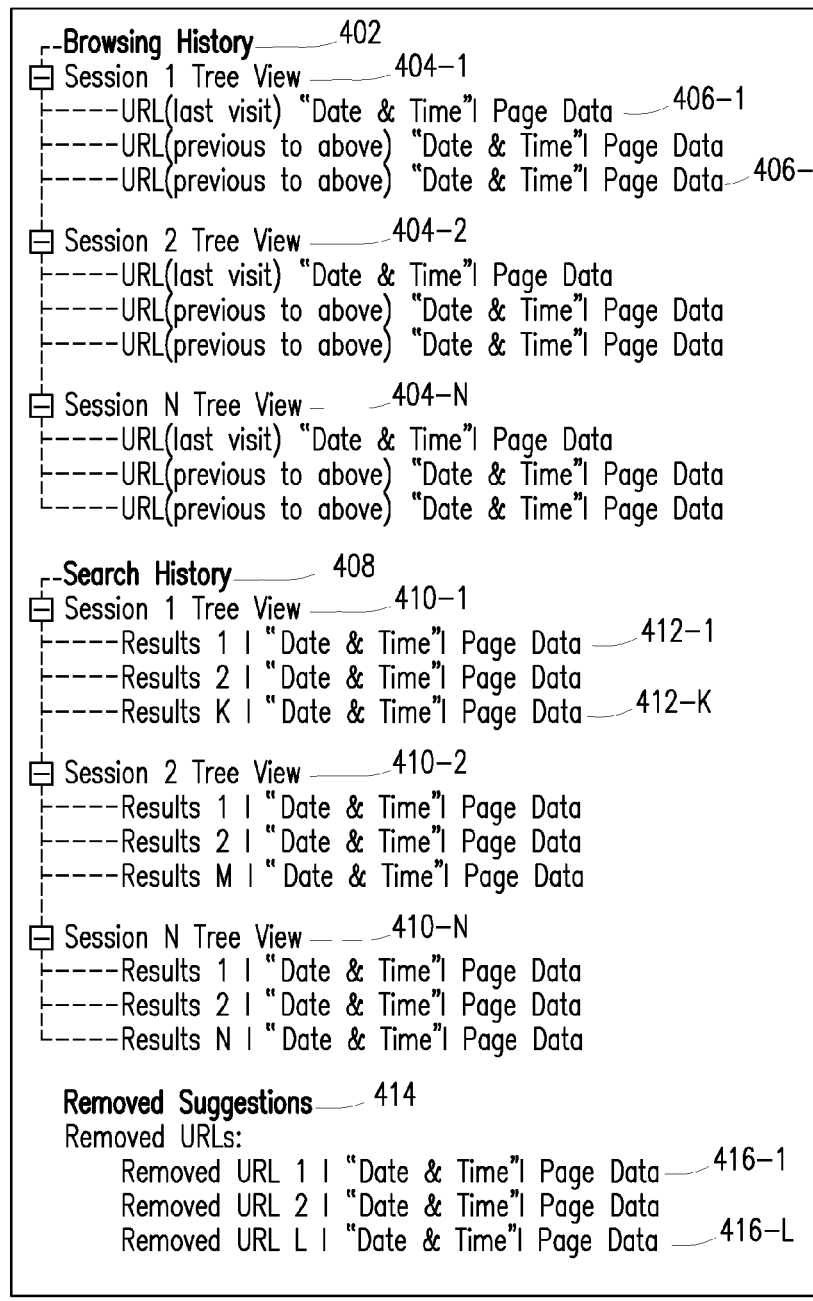
FIG. 4 depicts an example data storage structure associated with a searching application for practicing an embodiment of the present patent disclosure.

FIG. 4 depicts an example data storage structure 400 associated with a searching application for practicing an embodiment of the present patent disclosure. A browsing history database portion 402 may comprise data stored for each session that user/subscriber launches. By way of example, a nested tree view including a plurality of sessions data 404-1 to 404-N may be provided for storing such data on a session-by-session basis for each user. Each session's data may include one or more URLs visited in a chronological order (e.g., starting with time and date information of most recently visited web page) as well as all the data shown on the page (e.g., "page data"). Typically, page data may include all the data a user may see on each page visited by the user while browsing, e.g., topical information on the page based on the search term(s) entered, links to other pages or sites within the page, sponsored links, pop-up ads or commercials, and the like. Taking Session 1 tree view 404-1 as example, reference numerals 406-1 to 406-M refer to the data pertaining to a plurality (M) of URLs visited in that session, with the most recent URL data being listed first and the oldest URL's data being listed last. A search history database portion 408 may be stored for each searching session launched by the user, e.g., via a search engine. All data returned from a search may be stored along with the date and time of the search. By way of illustration, data for a plurality (N) of searches is organized as search data tree views 410-1 to 410-N, wherein each search data portion includes a plurality of results data, date and time information as well as page data. Reference numerals 412-1 to 412-K refer to such results data for Search 1 tree view 410-1, as an example.

A removed suggestions database portion 414 is operative to store data when the user removes a suggested/recommended website from a list of search results returned to the user in a search/browsing session (e.g., by the UTSA program). Similar to the other database portions, removed suggestions database portion 414 includes date and time information as well as page data pertaining to the URLs removed by the user. By way of example, reference numerals 416-1 to 412-L refer to such data corresponding to a plurality (L) of removed URLs. As discussed hereinabove, the removed suggestions data may be used for iteratively training the PAM and machine learning component of UTSA. It should be appreciated that as the removed suggestions data may be continually updated, a user may selectively discard a portion of the data (e.g., by discarding data gathered before a particular date, applying suitable timing window constraints, etc.), although such "data curation" is not essential for purposes of the present disclosure. Furthermore, while a "tree-like" data structure 400 is exemplified in FIG. 4, it is merely illustrative and each of the database portions (and/or any sub-portions thereof) may comprise huge amounts of data stored/distributed across several database nodes according to "Big Data" storage techniques.

Figure 5:
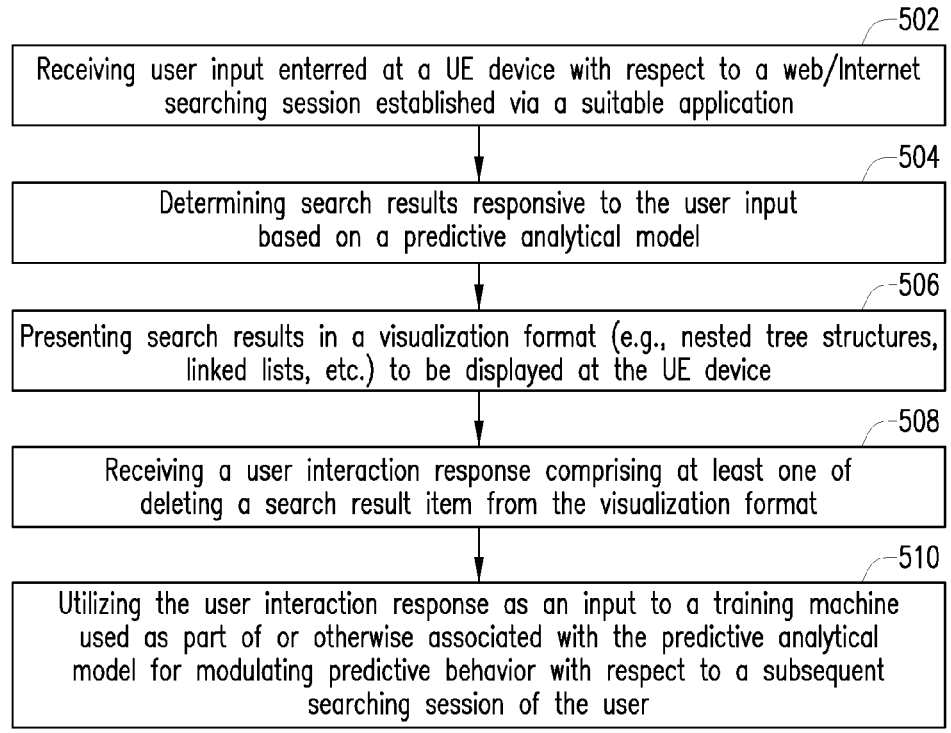
FIGS. 5 and 6 depict flowcharts of various blocks, steps and/or acts illustrative of one or more embodiments of the present patent disclosure.
Figure 6:
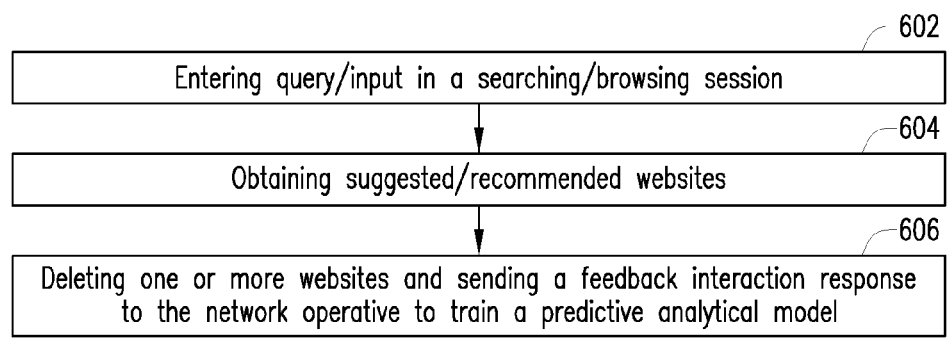

FIGS. 5 and 6 depict flowcharts of various blocks, steps and/or acts illustrative of one or more embodiments of the present patent disclosure. In particular, an embodiment of an Internet searching application method or process 500 is shown in FIG. 5, wherein a number of blocks, steps and/or acts that may take place in a server environment are illustrated. At block 502, user input entered at a UE device with respect to web/Internet searching/browsing session is received. As described above, such user input may be entered via suitable browsing/searching applications executing on a variety of devices. Appropriate search results responsive to the user input may be determined based on a predictive analytical model (block 504), which may be suitably processed for presentation in a visualization format to be displayed at the UE device. As will be seen hereinbelow, an example visualization format may comprise one or more presentation views of the suggested/predicted websites corresponding to the search as well as a graphical representation of past websites (block 506). Such presentation views may include one or more portions or sub-portions, and may comprise lists, linked/nested lists, charts, trees, linked/nested trees, constellations of website icons or other graphical indicia, and the like. Regardless of the type/content of a presentation view, it is configured for receiving appropriate user interaction responses. A user interaction response comprising, for example, deleting one or more search result items (i.e., websites, pages, links, etc.) from the search result pages (e.g., in a visualization format) may be received from the user via suitable UE interface (block 508). In one variation, a user may also be allowed to remove one or more past websites visited by the user. Preferably, at least a portion of user interaction response data may be utilized as an input to a training machine used as part of or otherwise associated with the predictive analytical model for modulating its predictive behavior with respect to future searches by the user (block 510). It should be appreciated that in one implementation of the foregoing scheme, each time a registered user logs on and begins searching/browsing the Internet, the UTSA and associated machine learning component may be executed to present suggested websites to the user, wherein the UTSA/machine learning functionality may apply suitable predictive analytics to the stored unstructured data in order to discern patterns that conventional predictive models overlook. Since "Big Data" techniques involving hundreds and thousands of data points are employed, the "predictiveness" of the UTSA mechanism of the present patent disclosure increases as the datasets get increasingly larger.

FIG. 6 depicts a flowchart of a process 600 that involves user-side interactions according to an embodiment of the present patent disclosure. At block 602, a user query or input is entered via a suitable UE interface with respect to a searching/browsing session. At block 604, a plurality of predicted/suggested websites are obtained from the UTSA service with which the user is registered. One or more user interactive responses (e.g., deleting a particular website from the suggested websites) may be effectuated (block 606), which is operative as a feedback mechanism to train a predictive analytical model employed by the UTSA service.

Figure 7:
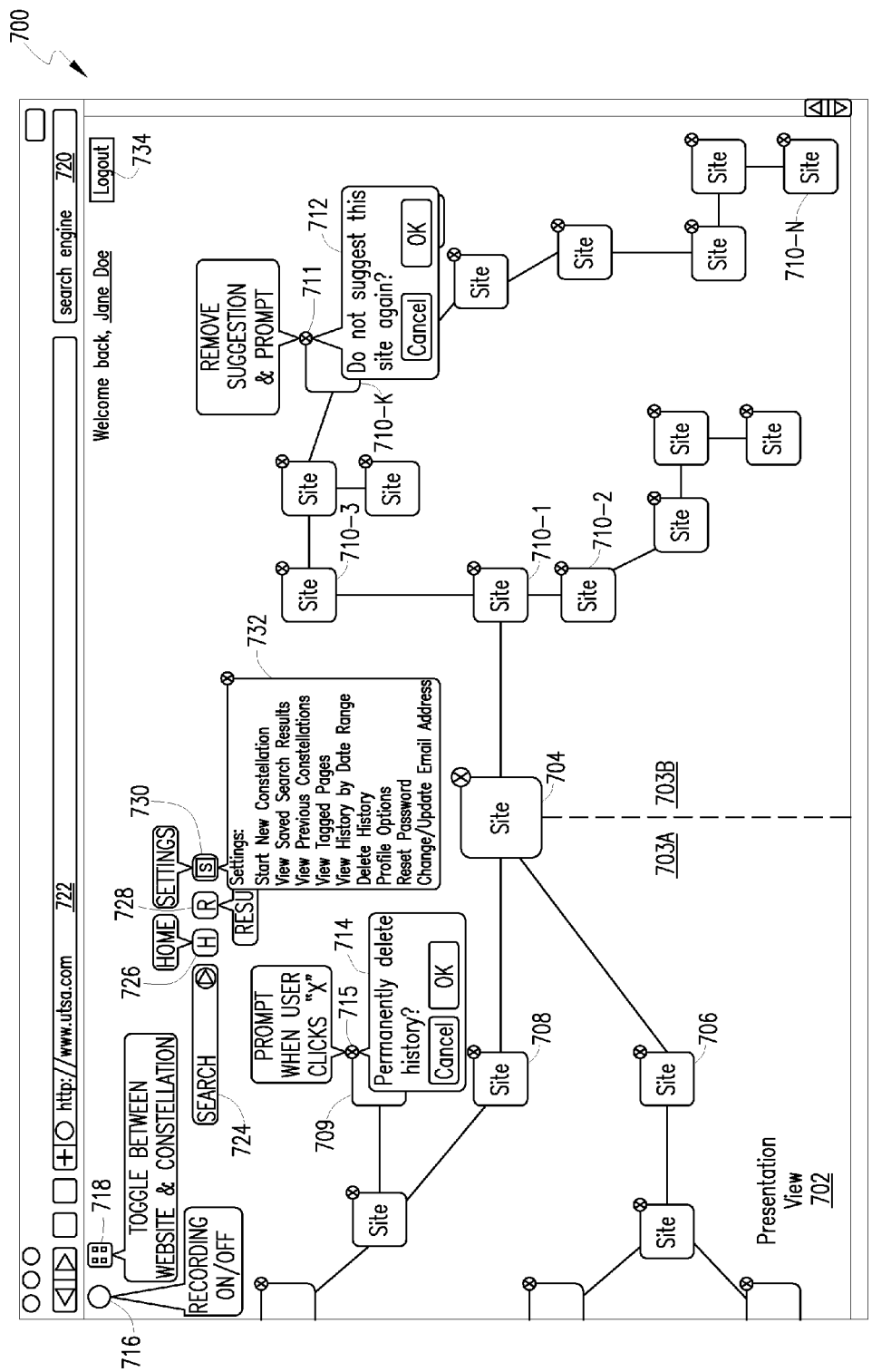
FIG. 7 depicts an example user interface (UI) display for presenting search results in a presentation view according to an embodiment of the present patent disclosure.

FIG. 7 depicts an example user interface (UI) display 700 for presenting search results in a presentation view 702 according to an embodiment of the present patent disclosure. A command line bar 722 of a browser application and one or more search engine interfaces 720 associated therewith are exemplary input interfaces where a user may enter appropriate website addresses and/or search terms relative to a searching/browsing session. A software button (also referred to as a radio button or option button) 716 may be provided whereby a user may indicate consent with respect to recording the searching/browsing data as well as user interaction response data, for example, on a session-by-session, at a cloud storage facility associated with the UTSA service. A toggle switch 718 is operative to facilitate the user to select between a website and a constellation of search results. A logout button 734 is operative to facilitate the user to log off from the UTSA service. It should be appreciated that the UTSA service's web page may be configured as a "home page" for the user such that when the user launches a browser application, the user is taken to the UTSA service's web page. Alternatively, the user may need to browse or navigate to the UTSA service's web page by entering a suitable URL. Thereafter, the user may be required to enter certain credentials (e.g., a user ID and password) to launch the UTSA program, whereby a display view such as display 700 may be presented to the user.

A search input line or bar 724 is operative to accept user input of one or more search terms, which may further be defined in terms of Boolean relationships such as AND, OR, NOT, etc. In one implementation, entering a search term in input line 724 and activating a search button associated therewith may result in a pop-up window that contains search results relative to the searched term. An option may be provided to the user to save the search results from the pop-up window (not explicitly shown). A plurality of additional software buttons may be provided for facilitating further user interactions. A "Home" (H) button 726 is operative to navigate the user to a home website. A "Results" (R) button 728 is operative to toggle between a current search results page and a previous search results page. A "Settings" (S) button 730 is operative to provide a plurality of pull-down menus 732 to the user. By way of illustration, the following menu options may be provided: Start New Constellation, View Saved Search Results, View Previous Constellations, View Tagged Pages, View History by Date Range, Delete History, Profile Options, Reset Password, and Change/Update Email Address. Each of the menu options may launch additional pull-down submenus, pop-up windows, or other options. For example, selecting View Saved Search Results option may launch a pop-up window that shows a list of previously saved search results pages along with time/day information associated therewith. Selecting Delete History option may allow a user to delete browsing/ searching history over variable periods of time (e.g., Last Ten Minutes, Last Hour, Last 24 Hours, Last 7 days, Last Month, Last Year, etc.), including deleting all data ever recorded for the user. Profile Options button is operative for allowing the user to input and/or update appropriate demographic data, preferences data, interests data, and the like.

Presentation view 702 of example display 700 may preferably comprise a visualization format wherein a plurality of previously visited websites (which may be represented by respective icons, symbols, logos or other graphical indicia) may be presented in a graphical interconnected tree form on one side of the most recently visited website, e.g., website 704. Likewise, a plurality of suggested websites (as represented by respective icons or logos) may also be presented in a graphical interconnected tree form on another side of the most recently visited website 704 (e.g., opposite to the previously visited websites). Accordingly, in one example implementation, presentation view 702 may be represented as a "constellation view" that may be viewed as comprising two smaller constellations 703A, 703B (i.e., sub-constellations or sub-portions, which may be referred to as first and second portions or sub-portions), with the most recently visited website 704 disposed therebetween, wherein sub-constellation 703A includes the previously visited websites, e.g., websites 706, 708, 709, and sub-constellation 703B includes the suggested websites 710-1 to 710-N. The graphical interconnected tree form of sub-constellation 703A is constructed preferably based on a traversal history of the user regarding how the user navigated from one website to another in one or more Internet searching/browsing sessions. As pointed out previously, such traversal history may include the user's navigation data gathered from searches conducted on a plurality of UE devices associated with the user. With respect to sub-constellation 703B, the graphical interconnected tree form of the suggested websites 710-1 to 710-N shown therein may preferably be based on their relationship predicted by the UTSA service's predictive analytics. Websites in each of the sub-constellations are amenable to several types of user interaction. For example, clicking on the logo/icon of a visited website in sub-constellation 703A may yield a pop-up window that lists site-specific browsing history, e.g., all web pages accessed at/from that website in relation to one or more browsing/searching sessions. A software button associated with the website may be activated by the user to delete at least a portion of the history data. For example, clicking on a button or graphical interface element 715 associated with website 709 may prompt the user in a pop-up window 714 with an option to selectively/permanently delete the browsing history associated with that site. Similarly, software buttons associated with the suggested websites' icons may be activated by the user to selectively remove the suggested websites from future search results. For example, clicking on a button or graphical interface element 711 associated with suggested website 710-K may prompt the user in a pop-up window 712 with an option to exclude the website from being suggested again. As discussed previously, all such user interactions may be captured, processed and provided as training input to the UTSA service's predictive/adaptive modeling components.

Figure 8:
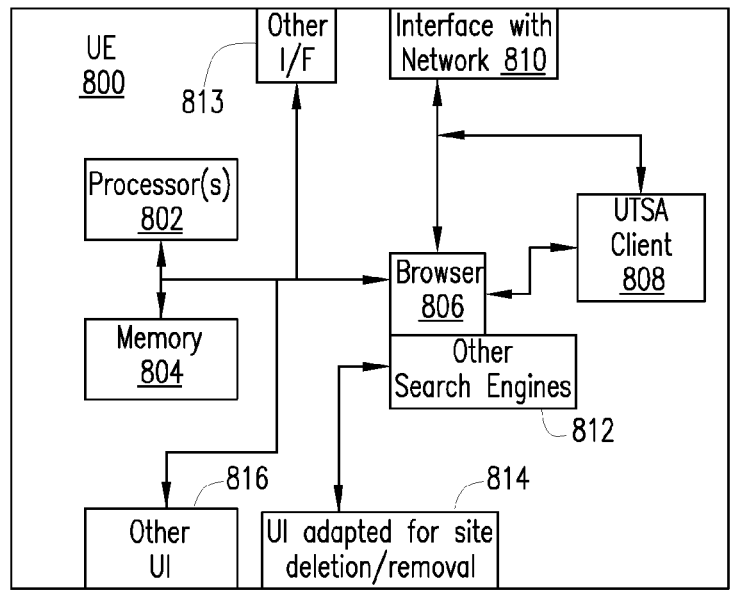
FIG. 8 depicts a block diagram of example user equipment (UE) operable as a client device for purposes of the present patent application.

FIG. 8 depicts a block diagram of example user equipment (UE) 800 operable as a client device for purposes of the present patent application. One or more processors 802 and associated memory 804 (which may comprise volatile memory and/or non-volatile memory) may be configured to execute one or more browsers 806 and search engines 812, preferably in association with a UTSA client module 808. A network interface 810 may be provided to effectuate interactivity with a UTSA server environment via suitable wireline/wireless access technologies. A user interface 814 may be provided that is operative to display search results in a suitable visualization format, wherein user interaction responses with respect to visited and/or suggested websites may be facilitated as described above. UE device 800 may also be provided with various other UI modules 816 (e.g., touch/keypad input, pointing device, voice command input, etc.) as well as other interfaces 813 relative to, for instance, short-range/long-range radio communications and/or optional local area network connectivity.

Figure 9:
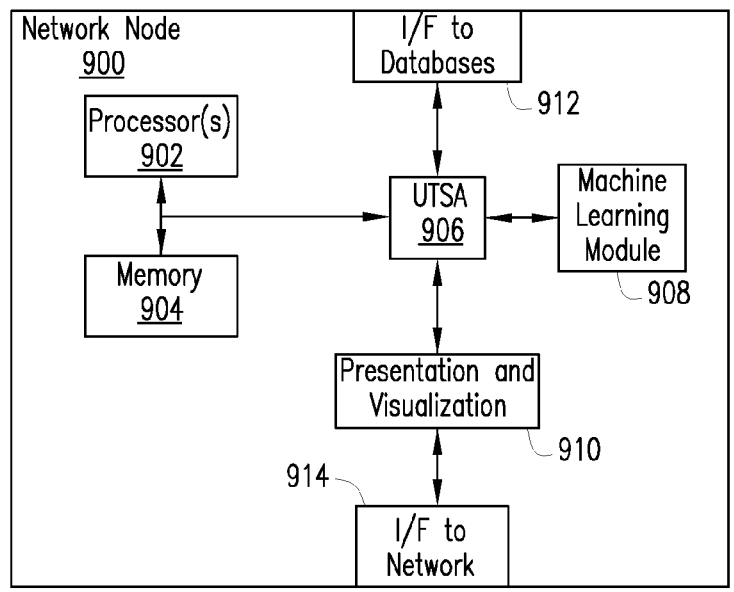
FIG. 9 depicts a block diagram of a network node adapted to host a user-trainable searching application according to an embodiment of the present patent application.

FIG. 9 depicts a block diagram of a network node 900 adapted to host at least part of a UTSA service according to an embodiment of the present patent application. It should be appreciated that network node 900 may comprise a single element in a server farm adapted to execute the UTSA service. One or more processors 902 and associated memory 904 (which may comprise volatile memory and/or non-volatile memory) may be configured to execute the software or program instructions of a UTSA module 906 in conjunction with a machine learning module 908. A presentation and visualization module 910 is operatively coupled to a suitable network interface 914 for presenting search results data to a user via appropriate network infrastructure. Network node 900 may also be provided with suitable interface modules 912 for effectuating connectivity to search/browsing database storage elements (not specifically shown).

One skilled in the art will recognize that that the foregoing SVM-based approach can provide or otherwise operate as an alternative and/or complement to the traditional scorecard modeling techniques used in integrating a set of rules for quantitatively assessing potential website predictions. The SVM-based embodiments can advantageously increase the efficiency to build and update a scorecard as the datasets get increasingly larger. In addition, the SVM-based embodiments may be configured to leverage suitable feature selection strategies, e.g., using the deleted website suggestions, to train the model and negate the impact of subjective manual selections.

The skilled artisan will further recognize that the SVM-based embodiments set forth herein configure a scorecarding model as a classification problem focusing on predictability, using appropriate machine-learning techniques. By training an SVM classifier, new, not previously visited websites may be classified into relevant/non-relevant classes, whereby the probabilities of belonging to the "relevant" classes may be generated. Consistent with the embodiments described above, the following steps or stages may be provided as part of an SVM-based implementation for purposes of the present patent application.

Data collection and storage: Data with respect to user searching and/or browsing may be collected through a generic or custom application that a user may be required to register with, preferably from any user-associated device and stored in a cloud-based storage environment.

Data manipulation/pre-processing: In the stage, the raw datasets may be manipulated and/or pre-processed so that the data can be used for modeling purposes. Either customized code and/or off-the-shelf applications may be used to filter the data appropriately whereby data points of interest are collected and the number and velocity of key words are measured.

SVM classifier training: A suitable variable is selected as a classifier variable for initial relevant/non-relevant classification, based on deleted websites data, and for generating initial probabilities of websites being relevant.

As for the relevance predictions, a suitable probability estimation function may be implemented wherein all pair-wise comparisons involving a multi-class classification scheme may be used to solve the system. By way of illustration, the following scheme sets forth an example system:

$$p_i = \sum_{j:j \neq i} \left( \frac{p_i + p_j}{k-1} \right) r_{ij}, \forall_i$$

subject to $$\sum_{i=1}^{k} p_i = 1, p_i \geq 0, \forall_i$$

where $r_i$ is estimated pair-wise class probabilities of $\mu_{ij}$=P (y=i|y=i or j, x), and i, j are the labels of each class.

As described previously, the foregoing process is iteratively executed as the additional data are collected based on user interactions. One skilled in the art will recognize that because the overall objective is to suggest "best" sites based on a number of factors, including but not limited to probabilities and relevances, an inference-based learning technique such as, e.g., a relevance vector machine (RVM), may also be augmented within the foregoing methodology. As such, an example embodiment may be implemented using a general-purpose high-level dynamic programming language such as Python that allows programmers to implement the functionalities of various modules, blocks and subroutines in fewer lines of code than might be possible in languages such as C. Being extensible, Python-based implementations may be packaged into standalone executable programs compatible with various Operating Systems and computing environments.

Based upon the foregoing Detailed Description, it should be appreciated that one or more embodiments of the present disclosure can be advantageously implemented in a number of Internet searching/browsing environments wherein end-users may expect to obtain significantly better results relative to their searches.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein. Further, some terms may comprise trademarked terms regardless of whether such terms have explicitly been so identified and any proprietary rights therein may belong to the respective owners thereof.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Other blocks may also be added/inserted between the blocks that are illustrated. Whereas some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An Internet searching application method, comprising:
receiving a user query with respect to an Internet searching session established at a user equipment (UE) device;
determining search results responsive to the user query based on a user-trainable predictive analytical model, the search results including websites relevant to the user query, wherein relevance is predicted responsive to pair-wise comparisons between websites classified into multiple classes;
providing the search results for presentation via a user interface displayed at the UE device;
receiving a user interaction response comprising at least one of deleting a particular search result based on the user's perception of whether the particular search result is relevant to the user query; and
utilizing the user interaction response as an input to a training machine used in association with the predictive analytical model, wherein the user interaction response is used at least in part in selecting a classifier variable for classifying websites into the multiple classes, thereby modulating predictive behavior of the predictive analytical model with respect to future searching sessions of the user.

2. The Internet searching application method as recited in claim 1, wherein the user query comprises an alphanumerical search term entered in a command line of at least one of a search engine and a browser application launched at the UE device by the user.

3. The Internet searching application method as recited in claim 1, wherein the user query comprises a website's Uniform Resource Locator (URL) entered in a command line of a browser application launched at the UE device by the user.

4. The Internet searching application method as recited in claim 1, wherein the user query comprises selecting a website's URL in a search results page generated in the Internet searching session.

5. The Internet searching application method as recited in claim 1, wherein the user-trainable predictive analytical model comprises at least one of a support vector network, a support vector machine, a machine learning mechanism and a neural network, the user-trainable predictive analytical model further configured to suggest a plurality of websites responsive to the user query based on the user's browsing history data, search history data, and historical data relating to previous deletions of suggested websites by the user.

6. The Internet searching application method as recited in claim 5, wherein the search results are presented via the user interface as a visualization format comprising a first portion having a constellation of previously visited websites displayed on one side of a display area of the user interface and a second portion having a constellation of suggested websites displayed on another side of the display area of the user interface, with most recently visited website being disposed therebetween.

7. The Internet searching application method as recited in claim 6, wherein the constellation of previously visited websites are displayed in an interconnected graphical tree form based on a traversal history of the user regarding how the user navigated from one website to another in one or more Internet searching sessions.

8. The Internet searching application method as recited in claim 7, wherein the traversal history includes the user's navigation data gathered from a plurality of UE devices associated with the user.

9. The Internet searching application method as recited in claim 6, wherein the constellation of suggested websites are displayed in an interconnected graphical tree form based on their relationship predicted by the user-trainable predictive analytical model.

10. One or more network nodes configured to effectuate Internet searching based on user input, the one or more network nodes comprising:
one or more processors distributed among the one or more network nodes; and
one or more persistent memory modules distributed among the one or more network nodes and coupled to the one or more processors, the one or more persistent memory modules having program instructions stored thereon which, when executed by the one or more processors, are configured to:
responsive to receiving a user query with respect to an Internet searching session established at a user equipment (UE) device, determine a plurality of search results based on a user-trainable predictive analytical model, the search results including websites relevant to the user query, wherein relevance is predicted responsive to pair-wise comparisons between websites classified into multiple classes;
provide the search results to be presented via a user interface displayed at the UE device;
receive a user interaction response comprising at least one of deleting a particular search result based on the user's perception of whether the particular search result is relevant to the user query; and
process the user interaction response to utilize the user interaction response as an input to a training machine used in association with the predictive analytical model, wherein the user interaction response is used at least in part in selecting a classifier variable for classifying websites into the multiple classes, thereby modulate predictive behavior of the predictive analytical model with respect to future searching sessions of the user.

11. The one or more network nodes as recited in claim 10, wherein the user query comprises an alphanumerical search term entered in a command line of at least one of a search engine and a browser application launched at the UE device by the user.

12. The one or more network nodes as recited in claim 10, wherein the user query comprises a website's Uniform Resource Locator (URL) entered in a command line of a browser application launched at the UE device by the user.

13. The one or more network nodes as recited in claim 10, wherein the user query comprises selecting a website's URL in a search results page generated in the Internet searching session.

14. The one or more network nodes as recited in claim 10, wherein the user-trainable predictive analytical model comprises at least one of a support vector network, a support vector machine, a machine learning mechanism and a neural network, the predictive analytical model configured to suggest a plurality of websites responsive to the user query based on the user's browsing history data, search history data, and historical data relating to previous deletions of suggested websites by the user.

15. The one or more network nodes as recited in claim 14, wherein the program instructions are further configured to provide the search results via the user interface in a presentation view comprising a first portion having a constellation of previously visited websites displayed on one side of a display area of the user interface and a second portion having a constellation of suggested websites displayed on another side of the display area of the user interface, with most recently visited website being disposed therebetween.

16. The one or more network nodes as recited in claim 15, wherein the constellation of previously visited websites are displayed in an interconnected graphical tree form based on a traversal history of the user regarding how the user navigated from one website to another in one or more Internet searching sessions.

17. The one or more network nodes as recited in claim 16, wherein the traversal history includes the user's navigation data gathered from a plurality of UE devices associated with the user.

18. The one or more network nodes as recited in claim 15, wherein the constellation of suggested websites are displayed in an interconnected graphical tree form based on their relationship predicted by the user-trainable predictive analytical model.

19. One or more non-transitory computer-readable media containing instructions stored thereon which, when executed by one or more processors of a distributed server environment, effectuate Internet searching based on user input, the one or more non-transitory computer-readable media comprising:

a code portion, responsive to receiving a user query with respect to an Internet searching session established at a user equipment (UE) device, configured to determine a plurality of search results based on a user-trainable predictive analytical model, the search results including websites relevant to the user query, wherein relevance is predicted responsive to pair-wise comparisons between websites classified into multiple classes;

a code portion for facilitating presentation of the search results via a user interface displayed at the UE device;

a code portion for processing a user interaction response received from the user, the user interaction response comprising at least one of deleting a particular search result based on the user's perception of whether the particular search result is relevant to the user query; and a code portion for utilizing the user interaction response as an input to a training machine used in association with the predictive analytical model, wherein the user interaction response is used at least in part in selecting a classifier variable for classifying websites into the multiple classes, thereby modulating predictive behavior of the predictive analytical model with respect to future searching sessions of the user.

* * * * *